Oct. 3, 1933.  J. BLAHA ET AL  1,928,614
SIGNALING DEVICE FOR VEHICLE TIRES
Filed May 25, 1931  2 Sheets-Sheet 2
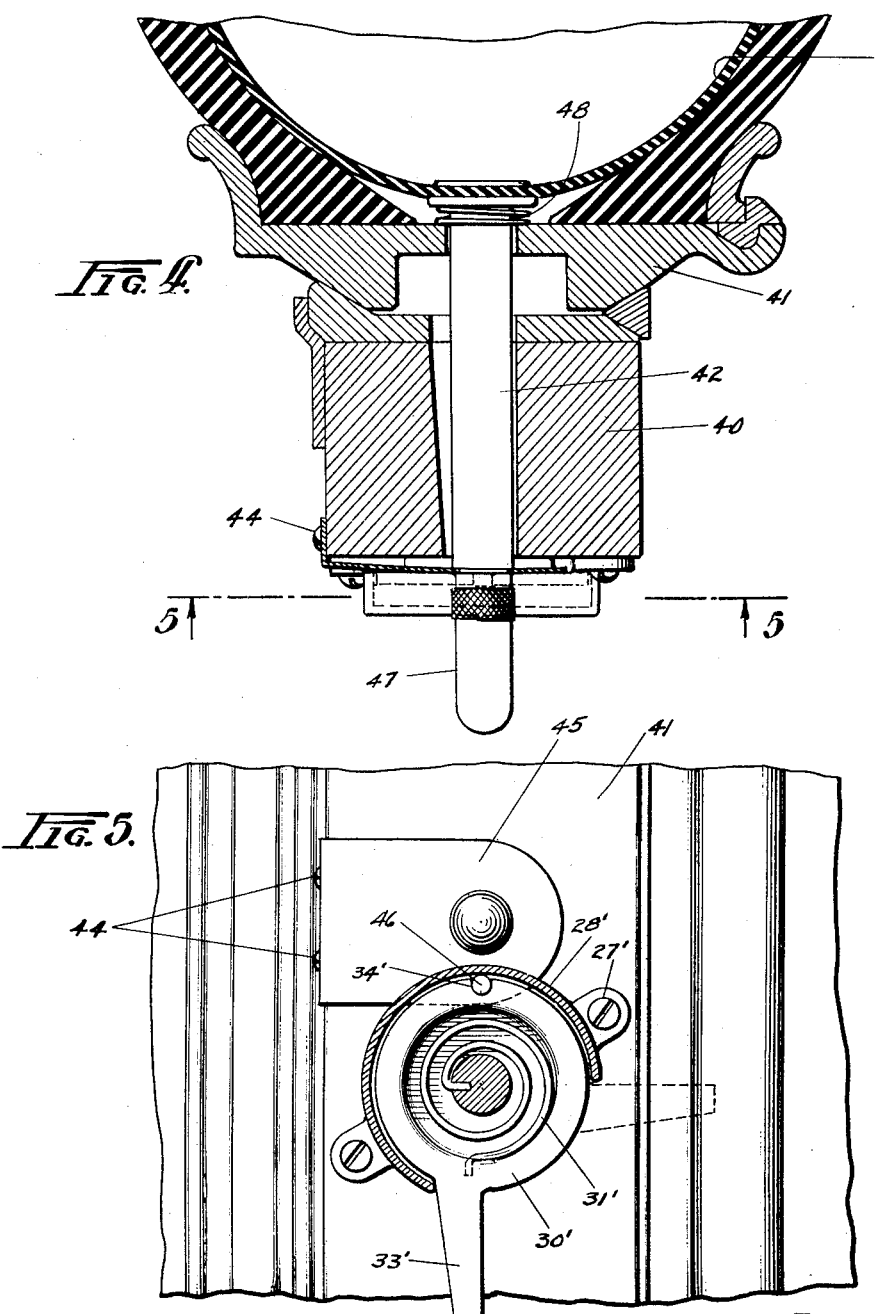

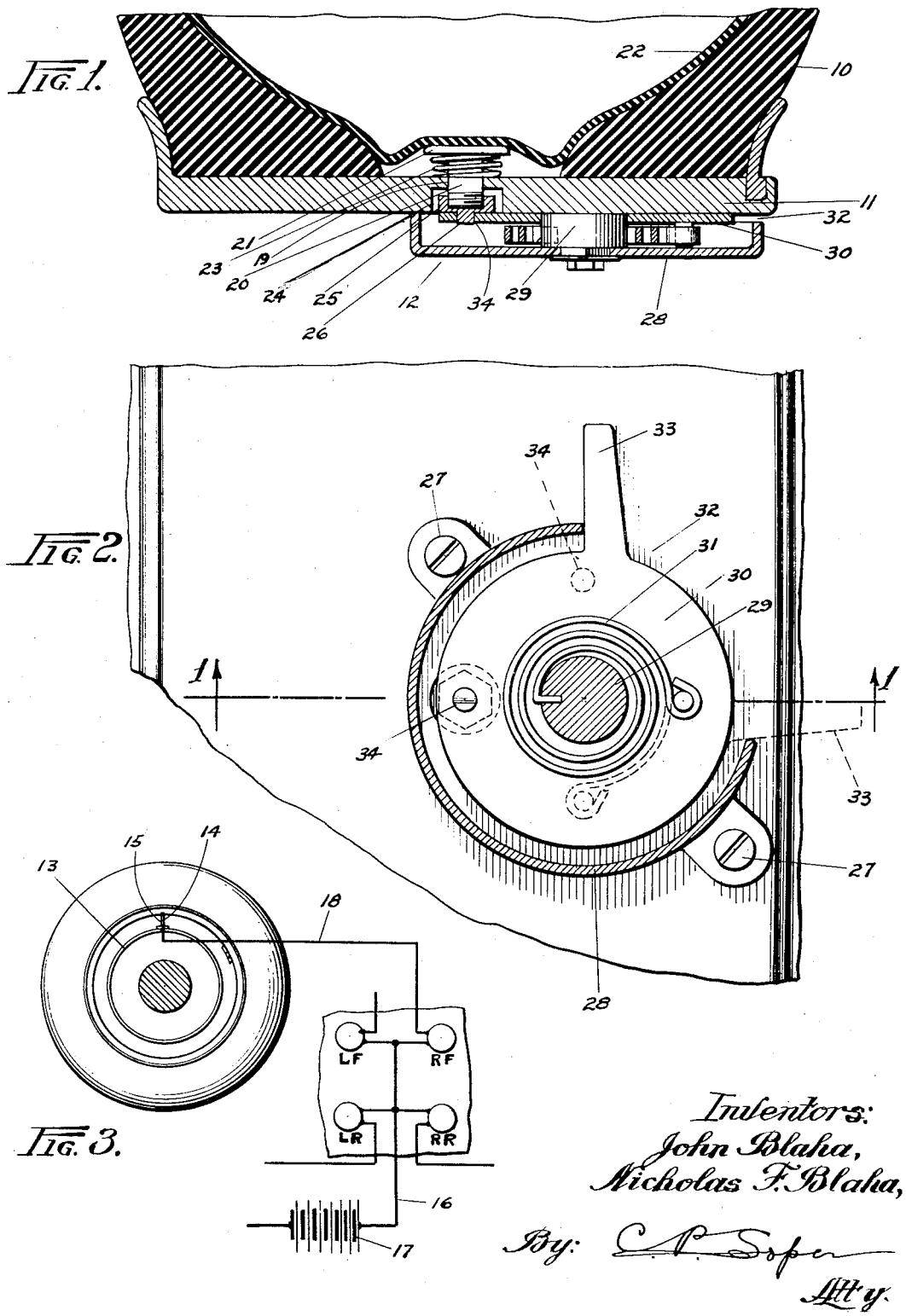

Patented Oct. 3, 1933

1,928,614

UNITED STATES PATENT OFFICE 1,928,614

SIGNALING DEVICE FOR VEHICLE TIRES

John Blaha and Nicholas F. Blaha, Chicago, Ill.

Application May 25, 1931. Serial No. 539,788

3 Claims. (Cl. 200—58)

This invention relates to new and useful improvements in signaling devices adapted to be used to indicate when the pressure within a pneumatic tire of a motor vehicle or similar device falls below a certain predetermined pressure whereupon an alarm, situated on the instrument board or other suitable mounting, will be actuated to indicate that the tire needs attention.

The object of the invention is the provision of a device of this character which will be reliable in operation, durable, cheap to manufacture and readily installed.

One of the features of the invention is the provision of resilient means associated with the valve stem of the inner tube or other device extending through the rim of the wheel which will effect the displacement of said stem, upon fall of pressure in the tube, and cause the alarm actuating means to be tripped into operative position.

Another feature of the invention resides in the means provided for closing the circuit of the alarm device.

A still further feature resides in the adjustable trip means on the valve stem and the manner it cooperates with the alarm actuating means.

Other features and advantages will appear from time to time as the description of the invention progresses.

At the present day when automobiles are driven at high rates of speed very disastrous accidents may be caused by the pressure in a tube falling below a predetermined dangerous point. This is particularly true where the balloon type tires are used for, on account of the greater diameter, a greater rolling action results than when the relatively small high pressure tires are employed.

The fall in pressure may be gradual and without undesirable result until a stretch of sandy road is encountered or a curve is taken at high speed. Now if the pressure in the tire is below the danger point there is a tendency of the tire to roll laterally, causing a lateral movement of the portion of the car carried thereby, throwing the car from its course and often causing it to get out of control. Often, upon attempting to straighten out the course after a roll in one direction, the tire will roll in the opposite direction, causing the car to pursue a zigzag course.

By the use of a reliable device to actuate an alarm adjacent to the driver, accidents caused by low pressure tires may be reduced to the minimum.

It is believed the further disclosure of the invention will be understood most readily from a detailed description thereof in connection with the accompanying drawings in which—

Fig. 1 is a transverse section through a portion of the tire, tube, rim and applicants' device substantially on the line 1—1 of Fig. 2;

Fig. 2 is a view of applicants' device, with a portion of the housing removed, as seen from the hub of the wheel, showing the contact finger in set in operative position in solid lines and in operative or released position in dotted lines;

Fig. 3 schematically illustrates the general arrangement of the invention and an electrical circuit which may be used therewith;

Fig. 4 is a transverse section through a portion of wheel rim and felloe showing a modified form of the invention; and Fig. 5 is a view of the device of Fig. 4 as seen from the hub of the wheel.

Referring now to the drawings, in which like reference characters indicate like parts in the several views 10 indicates the tire of a vehicle carried on the felloe 11. Carried by the felloe 11 is an alarm actuating device generally indicated at 12 in Fig. 1. Mounted on the brake band 13 of the wheel or other suitable non-rotatable part is a pair of contact springs 14 and 15. When the alarm actuating device is tripped, as will be hereinafter described, a finger is rotated to project laterally toward the opposite side of the car. Now, upon each rotation of the wheel, the finger just mentioned, will engage the outer end of contact spring 14 and force it into engagement with spring 15. Spring 15 is grounded to the car frame while spring 14 is insulatively mounted thereon or adjacent thereto in any suitable manner.

The alarm lights LF, RF, LR and RR preferably will be mounted in a cluster on the instrument board within view of the driver. It will be noted that the light RF is connected by means of conductor 16 on one side to the live pole of grounded battery 17. The other terminal of lamp RF is joined to spring 14 by means of conductor 18. It will now be obvious that every time spring 14 is forced into engagement with grounded spring 15 by the alarm actuating device at 12, a circuit will be momentarily completed for the light RF causing it to flash.

Each of the other wheels will be provided with like alarm actuating means which will be joined, respectively, to the signal lamps LF, LR and RR.

Having described in general the manner of operation of applicants' alarm device, the details of the alarm actuating device, indicated at 12 in Fig. 1, will now be described.

Extending through an opening 19 in the felloe 11 is a plunger 20 having an enlarged head 21 adapted to engage the tube 22 within the tire 10. A coil spring 23 surrounds the plunger 20 and tends to force the head 21 thereof toward the inner part of the tire. The felloe 11 is provided with a recess 24 within which is a nut 25 screw threaded on the end of plunger 20. A cotter pin or other device may be substituted for the nut 25. The purpose of the nut 25 is to limit the inward movement of the plunger 20 under influence of spring 23. At the outer end thereof the plunger 20 is provided with a reduced portion or dog 26, the purpose of which will presently appear.

Secured to the inner peripheral surface of felloe 11 as by screws 27 is a housing 28 which has the central outwardly extending lug or hub 29. Rotatably mounted about the hub 29 as an axis is a disc 30 of sheet metal or other suitable material. Positioned about the hub 29 is a coil spring 31, one end of said spring being secured to said hub 29 and the other to disc 30 as clearly shown in Fig. 2. The housing 28 is cut away at one side thereof, as indicated at 32, to receive the alarm actuating finger or arm 33.

Disc 30 is provided at one side thereof with a notch or opening 34 adapted to receive the end of dog 26 when the plunger 20 is forced outwardly by the pressure of the tube 22 against head 21 upon proper inflation of the tube. The disc 30 and finger 33 are shown in set or normal position by the solid lines in Fig. 2 and the finger 33 is shown in its released or alarm actuating position by dotted lines in this figure. In the solid line position the dog 26 will be positioned in the notch 34 to retain the finger 33 in inoperative position in the plane of felloe 11.

When, however, the pressure in tube 22 falls below a certain predetermined point, spring 23 will act to force the plunger 20 inwardly withdrawing the dog 26 from the opening 34 in plate 30 and permitting spring 31 to rotate the finger 33 to the position shown in dotted lines in Fig. 2. It will now be positioned to engage contact 14, upon rotation of the wheel, and actuate the alarm, as above described. The rotation of finger 33 under influence of spring 31 is limited by engagement with the end of the cut-away portion 32 of housing 28.

After the alarm on a wheel has been actuated and the pressure within the corresponding tube has been raised to the desired point, the finger 33 may be reset to its inoperative position merely by rotating it in a counter clockwise direction, as seen in Fig. 2, until dog 26 enters the opening 34 in plate 30.

In Figs. 4 and 5 is shown a modified structure in which the valve stem of the tube is substituted for the plunger 20 of Fig. 1 as a means for releasing the alarm actuating finger.

The alarm actuating finger, housing, spring, etc., in this modified form are substantially the same as that previously described, the description of these parts, therefore, will not be repeated but the parts will be indicated in the drawings by the same reference characters as employed in Figs. 1 and 2 but with the prime added.

In Fig. 4, 40 indicates the felloe of a wheel on which is the rim 41. At 42 is shown the usual valve stem forming part of tube 43. Secured to the side of felloe 40 as by screws 44 is a spring plate 45 having at one side thereof a lug or projection 46 adapted to engage the opening 34' in plate 30', in order to hold the alarm actuating finger in normal or set position. The valve stem 42 extends through an opening in the plate 45 as shown in Fig. 5, and after the tube has been inflated the valve cap 47 is adapted to be turned down on the screw threaded end of the stem 42 until it engages plate 45. If now the pressure in tube 43 falls below a certain point spring 48 acts to move the valve stem 42 inwardly. The cap 47 being in engagement with plate 45 will displace said plate until dog 46 is withdrawn from opening 34' and the alarm actuating device will be released as previously described. It will thus be seen that the operation of the device of Figs. 4 and 5 is substantially the same as that of Figs. 1 and 2.

While in the drawings and the above description certain definite details have been disclosed, it is to be understood that many modifications of the details of the invention are contemplated. The invention, therefore, should be limited only by the scope of the appended claims.

Having described our invention, what we claim as new and desire to secure by United States Letters Patent is:—

1. In a signaling device for indicating low pressure in a tire tube, a housing mounted on a wheel felloe and having an opening formed in one side thereof, a hub member mounted substantially centrally of said housing, a rotatable disc mounted on said hub member, said disc having an alarm actuating finger extending outwardly through the opening in said housing, spring means normally tending to rotate said disc to dispose said finger in alarm actuating position, means for locking said disc with the finger out of alarm actuating position including a spring pressed member in engagement with the tire tube, said means being operative to release said disc upon fall of pressure in the tube to permit rotation thereof to place said finger in alarm actuating position, movement of said finger being limited by the extremities of the opening in the housing.

2. In a signaling device for indicating low pressure in a tire tube, a housing mounted on a wheel felloe and having an opening formed in one side thereof, a hub member mounted substantially centrally of said housing, a rotatable disc mounted on said hub member, said disc having an alarm actuating finger extending outwardly through the opening in said housing, spring means normally tending to rotate said disc to dispose said finger in alarm actuating position, means for locking said disc with the finger out of alarm actuating position comprising a plunger having one end in engagement with the outer surface of the tire tube and the other end adapted to engage the rotatable disc, said plunger being operative to release said disc upon fall of pressure in the tube to permit rotation thereof to place said finger in alarm actuating position, movement of said finger being limited by the extremities of the opening in the housing.

3. In a signaling device for indicating low pressure in a tire tube, a housing mounted on a wheel felloe and having an opening formed in one side thereof, a hub member mounted substantially centrally of said housing, a rotatable disc mounted on said hub member, said disc having an alarm actuating finger extending outwardly through the opening in said housing, spring means normally tending to rotate said disc to dispose said contact finger in alarm actuating position, means for locking said disc with the finger out of alarm actuating position comprising a spring plate secured to the felloe, a lug carried by the plate adapted to engage the rotatable disc, a spring pressed valve stem extending through said plate and in engagement therewith, said valve stem and spring plate being operative to release said disc upon fall of pressure in the tube to permit rotation thereof to place said finger in alarm actuating position, movement of said finger being limited by the extremities of the opening in the housing.

JOHN BLAHA.
NICHOLAS F. BLAHA.